United States Patent [19]
Nishi et al.

[11] Patent Number: 4,812,828
[45] Date of Patent: Mar. 14, 1989

[54] VIDEO DISPLAY PROCESSOR

[75] Inventors: Kazuhiko Nishi; Takatoshi Ishii; Ryozo Yamashita, all of Tokyo; Shigemitsu Yamaoka; Takatoshi Okumura, both of Hamamatsu, all of Japan

[73] Assignees: ASCII Corporation, Tokyo; Nippon Gakki Seizo Kabushiki Kaisha, Hamamatsu, both of Japan

[21] Appl. No.: 106,007

[22] Filed: Oct. 7, 1987

Related U.S. Application Data

[63] Continuation of Ser. No. 739,035, May 29, 1985, abandoned.

[30] Foreign Application Priority Data

May 30, 1984 [JP] Japan .................. 59-110128

[51] Int. Cl.4 .............................. G09G 1/16
[52] U.S. Cl. ................... 340/706; 340/710; 340/720; 340/707; 273/312
[58] Field of Search .......... 340/706, 707, 708, 710, 340/720; 273/311-314, 148 B

[56] References Cited

U.S. PATENT DOCUMENTS

| | | | |
|---|---|---|---|
| 3,621,214 | 11/1971 | Romney | 340/720 |
| 3,793,481 | 2/1974 | Ripley et al. | 340/707 |
| 4,210,329 | 7/1980 | Steiger et al. | 273/312 |
| 4,395,045 | 7/1983 | Baer | 273/312 |

OTHER PUBLICATIONS

*The Lisa Computer System;* Williams; Byte Publications; 2/83; pp. 33-50.

Lisa Draw; Apple Product #A6L0342; 1983, 1984; pp. 72-75 & 80-81.

Primary Examiner—Marshall M. Curtis
Attorney, Agent, or Firm—Cushman, Darby & Cushman

[57] ABSTRACT

A video display processor (VDP) is connectable to an input control device such as a light pen and a mouse. The VDP comprises a counter circuit which is composed of an X counter and a Y counter. When a mouse mode is selected, X and Y pulse signals are supplied to the X and Y counters so that the contents of the X and Y counters represent the amount of movement of the mouse. When a central processing unit (CPU) connected to the VDP reads the contents of the X and Y counters in this mouse mode, the X and Y counters are reset. When a light pen mode is selected, the X and Y counters effect a count operation of a clock signal generated in the VDP in synchronism with the display of image on a screen so that the contents of the X and Y counters represents X-Y coordinates of a display element which is currently displayed on the screen. The CPU reads the contents of the X and Y counters in response to a light detection signal outputted from the light pen thereby to input the X-Y coordinates of the display element selected by the light pen. In a collision detection mode, the counter circuit effects the same counting operation as that effected in the light pen mode. The CPU reads the contents of the X and Y counters in response to a collision detection signal, which is generated by an associated circuit when animation patterns of the video image displayed on the screen overlap, thereby to input the X-Y coordinates of the collision position.

15 Claims, 10 Drawing Sheets

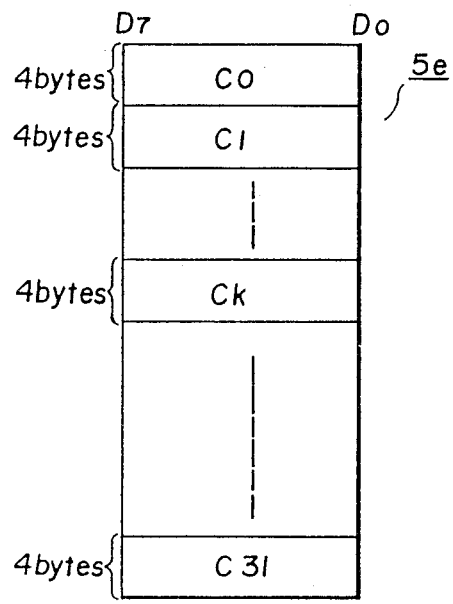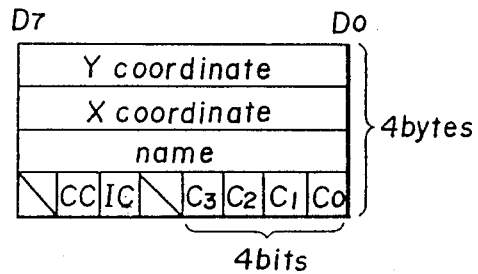

| color code | color data | | | color |
|---|---|---|---|---|
| | GD | RD | BD | |
| 0 0 0 0 | 0 0 0 | 0 0 0 | 0 0 0 | black (transparent) |
| 0 0 0 1 | 0 0 0 | 0 0 0 | 0 1 0 | dark blue |
| 0 0 1 0 | 0 0 0 | 0 1 0 | 0 0 0 | dark red |
| 0 0 1 1 | 0 0 0 | 0 1 0 | 0 1 0 | dark magenta |
| 0 1 0 0 | 0 1 0 | 0 0 0 | 0 0 0 | dark green |
| 0 1 0 1 | 0 1 0 | 0 0 0 | 0 1 0 | dark yellow |
| 0 1 1 0 | 0 1 0 | 0 1 0 | 0 0 0 | dark cyan |
| 0 1 1 1 | 0 1 0 | 0 1 0 | 0 1 0 | gray |
| 1 0 0 0 | 1 0 0 | 1 1 1 | 0 1 0 | beige |
| 1 0 0 1 | 0 0 0 | 0 0 0 | 1 0 0 | blue |
| 1 0 1 0 | 0 0 0 | 1 0 0 | 0 0 0 | red |
| 1 0 1 1 | 0 0 0 | 1 0 0 | 1 0 0 | magenta |
| 1 1 0 0 | 1 0 0 | 0 0 0 | 0 0 0 | green |
| 1 1 0 1 | 1 0 0 | 0 0 0 | 1 0 0 | yellow |
| 1 1 1 0 | 1 0 0 | 1 0 0 | 0 0 0 | cyan |
| 1 1 1 1 | 1 0 0 | 1 0 0 | 1 0 0 | white |

FIG. 7

VIDEO DISPLAY PROCESSOR

This is a continuation of application Ser. No. 739,035, filed May 29, 1985, which was abandoned upon the filing hereof.

BACKGROUND OF THE INVENTION

1. Field of the Invention

The present invention relates to a video display processor for use in terminal equipment for a computer, a game machine or the like.

2. Prior Art

There have been proposed various kinds of display control systems which comprise a video display processor and display animation and still images on a screen of a CRT (cathode-ray tube) display unit under the control of a CPU (central processing unit). FIG. 1 shows one example of such conventional systems which comprises a video display processor (hereinafter referred to as "VDP") 101 and a central processing unit (CPU) 102. The system further comprises a memory 103 which includes a ROM (read only memory) storing a variety of programs to be executed by the CPU 102 and a RAM (random access memory) for storing other necessary data. The CPU 102 outputs data representative of still and animation images to be displayed on a screen of a CRT display unit 104 to the VDP 101 which in turn stores the still and animation data into a video RAM (hereinafter referred to as "VRAM") 105.

Upon receipt of a display command from the CPU 102, the VDP 101 sequentially reads the still and animation data from the VRAM 105 in accordance with scanning synchronization signals of the CRT display unit 104, and supplies the read data to the CRT display unit 104 thereby to display the still and animation images on the screen of the CRT display unit 104.

In such a video display control system, it is frequently desired to use an input control device such as a mouse or a light pen to facilitate the input of X-Y coordinates of a selected display point in a video image on the screen so that the system can be used for various purposes. However, what has not heretofore been proposed is a video display processor which is connectable to such an input control device and capable of processing the point on the screen by it in the form of X-Y coordinates. Incidentally, when a video display processor is used with an input control device such as a light pen, the processor should generate data representative of X-Y coordinates of a display point on the screen which is selected through the light pen. On the other hand, when the video display processor is used with an input control device such as a mouse, the processor should generate data representative of the amount of movement of the mouse. Therefore, a video display processor which is connectable to both of a light pen and a mouse should incorporate therein a complicated circuitry including at least two different data generating circuits. However, in order to construct such a video display processor as an LSI chip, the circuitry should be minimum.

SUMMARY OF THE INVENTION

It is therefore an object of the present invention to provide a video display processor which is connectable to an input control device such as a light pen and a mouse.

It is another object of the present invention to provide a video display processor which is connectable to a plurality of different input control devices with a minimum circuitry.

According to a first aspect of the present invention, there is provided a video display processor adapted to be connected to a central processing unit and a video image display unit for displaying a video image composed of a plurality of display elements on a screen of the video image display unit under the control of the central processing unit, the video display processor comprising (a) clock signal generating means for generating a clock signal; (b) image data output means for outputting a plurality of image data, each representative of a respective one of the plurality of display elements of the video image to the video image display unit in accordance with the clock signal; (c) detection signal generating means for generating a detection signal when a selected one of the display elements is displayed on the screen; and (d) counter means for counting the clock signal to output count data representative of X-Y coordinates of a display position of the display element whose image data is being outputted from the image data output means, the central processing unit reading the count data outputted from the counter means when the detection signal is outputted. The detection signal generating means may comprise light pen interfacing means connectable to a light pen, the circuit means generating the detection signal when the light pen outputs a light detection signal. The detection signal generating means may also be collision detection means for generating a collision detection signal when the image data output means outputs the plurality of image data in such a manner that animation patterns included in the video image displayed on the screen overlap.

According to a second aspect of the present invention, there is provided a video display processor adapted to be connected to a central processing unit and a video image display unit for displaying a video image on a screen of the video image display unit under the control of the central processing unit, the video display processor comprising counter means connectable to a device, which is movable on a surface and outputs a pulse signal in accordance with the movement thereof, for counting the pulse signal to output movement amount data representative of amount of the movement of the device, the counter means being reset when the central processing unit reads the movement amount data from the counter means. The pulse signal outputted from the device may comprise an X-component pulse signal generated in accordance with the X component of the movement of the device and a Y-component pulse signal generated in accordance with the Y component of the movement of the device, the counter means comprising X counter means for counting the X-component pulse signal to output first data representative of amount of the X component of the movement of the device and Y counter means for counting the Y-component pulse signal to output second data representative of amount of the Y component of the movement of the device.

According to a third aspect of the present invention, there is provided a video display processor adapted to be connected to a central processing unit and a video image display unit for displaying a video image composed of a plurality of display elements on a screen of the video image display unit under the control of the central processing unit, the video display processor comprising (a) clock signal generating means for generating a clock signal; (b) image data output means for outputting a plurality of image data each representative of a respective one of the plurality of display elements of the video image to the video image display unit in accordance with the clock signal; (c) detection signal generating means for generating a detection signal when a selected one of the display elements is displayed on the screen; (d) mode selection means for selecting one of first and second modes, the mode selection means outputting a first mode signal when the first mode is selected, the mode selection means outputting a second mode signal when the second mode is selected; and (e) counter means connectable to a device which is movable on a surface and outputs a pulse signal in accordance with the movement thereof, the counter means counting, in response to the first mode signal, the pulse signal to output movement amount data representative of amount of the movement of the device and being reset when the central processing unit reads the movement amount data outputted from the counter means, the counter means counting, in response to the second mode signal, the clock signal to output count data representative of X-Y coordinates of a display position of the display element whose image data is being outputted from the image data output means, the central processing unit reading the count data from the counter means when the detection signal is outputted.

BRIEF DESCRIPTION OF THE DRAWINGS

FIG. 4-(b) is an illustration of one example of the animation patterns of FIG. 4-(a);

FIG. 5-(a) is an illustration showing the animation pattern control table 5e in which animation pattern control tables C0 to C31 are stored;

FIG. 5-(b) is an illustration showing one of the animation pattern control tables stored in the animation pattern control table area 5e;

FIG. 7 is an illustration showing the relationship of color codes, color data and colors used in the system of FIG. 2;

DESCRIPTION OF THE PREFERRED EMBODIMENT OF THE INVENTION

Figure 2:
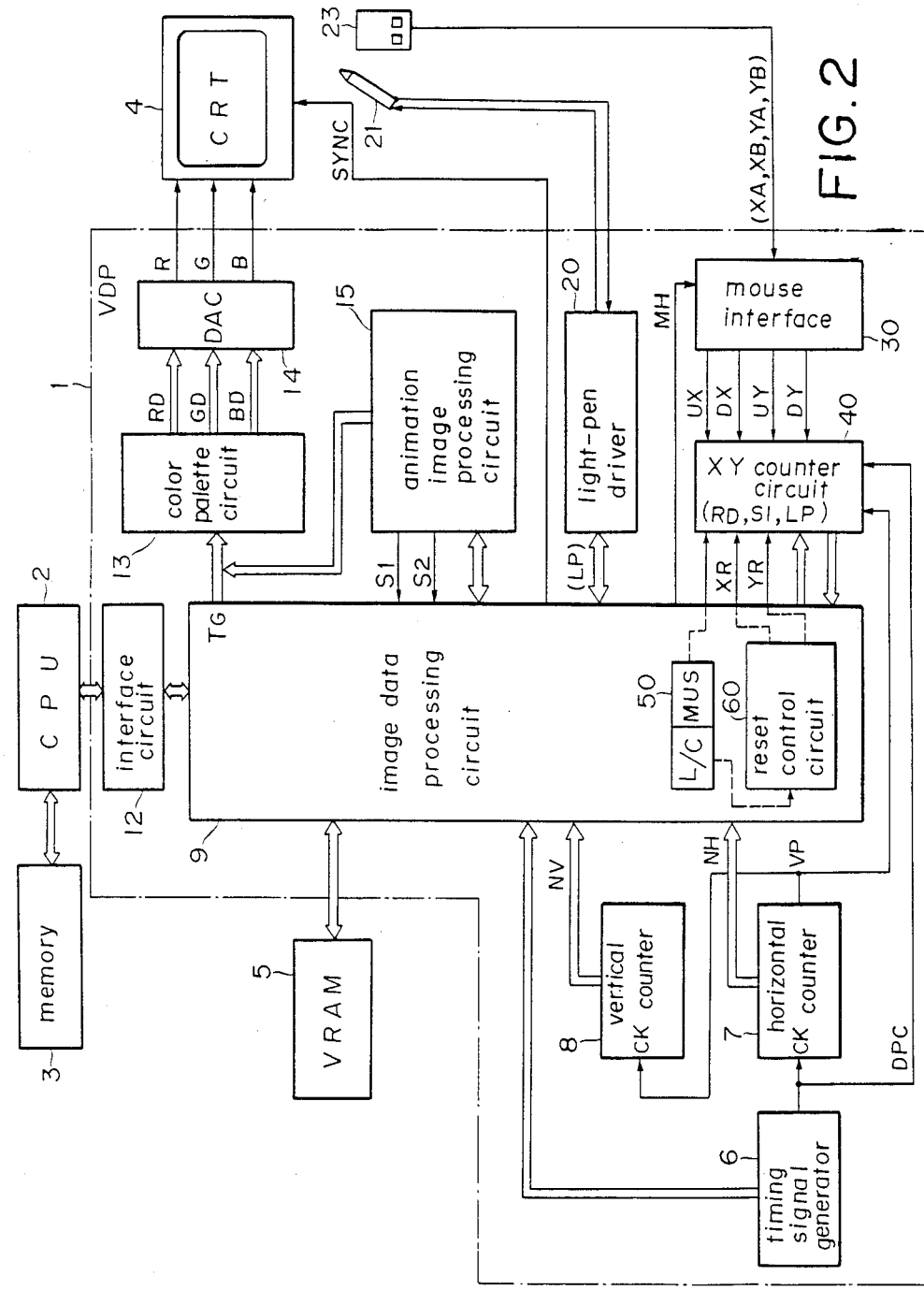
FIG. 2 is a block diagram of a video display control system comprising a video display processor (VDP) 1 provided in accordance with the present invention.
Figure 3:
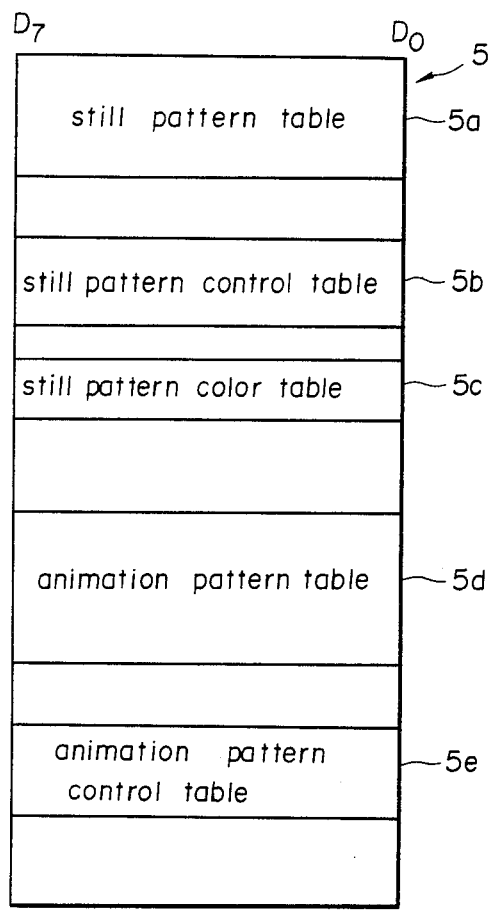
FIG. 3 is a memory map of a VRAM 5 in the video display control system of FIG. 2 which comprises a still pattern table area 5a, a still pattern control table area 5b, a still pattern color table area 5c, an animation pattern table area 5d, and an animation pattern control table area 5e.

Shown in FIG. 2 is a video display control system comprising a video display processor (VDP) 1 provided in accordance with the present invention. The system comprises a central processing unit (CPU) 2 which controls the VDP 1 to cause selected pattern images to be displayed on a screen of a CRT display unit 4 in accordance with image data stored in a video RAM (VRAM) 5. A memory 3 comprises a ROM storing programs to be executed by the CPU 2 and a RAM for storing data to be processed by the CPU 2. As shown in FIG. 3, the VRAM 5 comprises a still pattern table area 5a for storing data representative of dot patterns of still patterns, a still pattern control table area 5b for storing data representative of the display position of each still pattern, a still pattern color table area 5c for storing a color code (4 bits) of each still pattern, an animation pattern table area 5d for storing data representative of a plurality of animation patterns, and an animation pattern control table area 5e for storing data representative of the display position of each animation pattern.

Figure 4A:
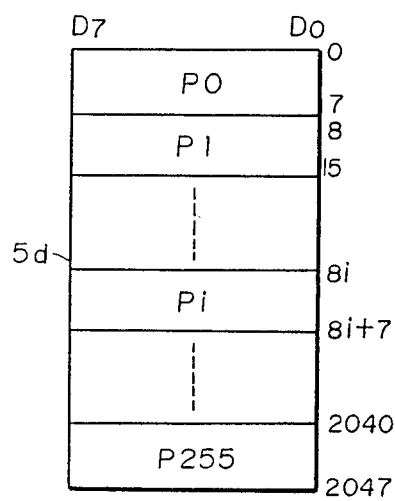
FIG. 4-(a) is an illustration of the animation pattern table area 5d in which animation patterns P0 to P255 are stored.
Figure 4B:
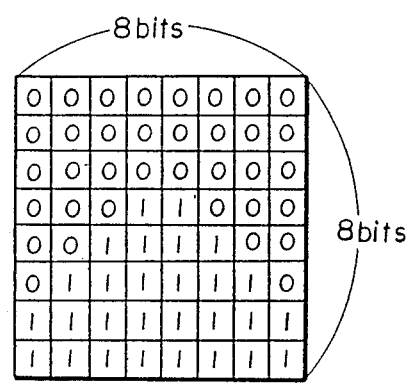

The animation pattern table area 5d stores, as shown in FIG. 4-(a), 256 animation pattern data points P0, P1, P2 ... P255 each composed of 8 bytes. Thus, each of the animation pattern data P0 to P255 represents an animation pattern which is composed of 8 X 8 bits (one example is shown in FIG. 4-(b)). In this case, an image constructed by bits "1" of each pattern data represents an animation pattern image to be displayed, while the place of bits "0" thereof is displayed as a background of the animation pattern image.

As shown in FIG. 5-(a), the animation pattern control table area 5e stores 32 tables C0, C1, C2 ... C31 each composed of 4 bytes (FIG. 5-(b)). A name of a selected animation pattern Pi (i=0, 1, 2 ... 255) is stored in the third byte of each animation pattern control table Ck (k=0, 1 ... 31), and the column position (X coordinate) and row position (Y coordinate) of the display position of the animation pattern Pi are stored in the second byte and first byte of the table Ck, respectively, as shown in FIG. 5-(b). A color code of the animation pattern Pi is stored in the lower four bits of the fourth byte of the table Ck. Stored in the sixth and seventh bits of the fourth byte of the table Ck are data designating the mode of processing of the animation patterns.

The VDP 1 will now be more fully described. A timing signal generator 6 (FIG. 2) generates a master clock pulse in accordance with an output of a crystal oscillator provided therein, and produces, based on the master clock pulse, a dot clock pulse DCP which is supplied to a clock input terminal CK of a horizontal counter 7. The dot clock pulse DCP corresponds to each display element displayed on the screen of the display unit 4, or in other words, the dot clock pulse DCP is synchronized with a display timing of each of the display elements which are sequentially displayed on the screen in accordance with the horizontal scanning of the screen. The timing signal generator 6 also generates various kinds of timing signals necessary for processing the image data and outputs them to an image data processing circuit 9.

The horizontal counter 7 is a binary counter of a modulo "341" and is reset at the beginning of each horizontal scanning of the screen. The horizontal counter 7 outputs a pulse signal VP to a clock input terminal CK of a vertical counter 8 each time the dot clock pulse DCP is counted 341 times. A count output NH of this horizontal counter 7 indicates whether the actual display operation of display elements on a horizontal scanning line is being made or a horizontal blanking operation is being made. The count output NH of the horizontal counter 7 also represents the number of the display element which is currently displayed on a horizontal scanning line. In this embodiment, 256 display elements are displayed on one horizontal scanning line, so that during a horizontal non-display period, the dot clock pulse DCP is counted 85 times.

The vertical counter 8 is a binary counter of a modulo "262" and is reset at the beginning of each vertical scanning of the screen. A count output NV of this vertical counter 8 indicates whether the actual display operation in the vertical direction is being made or a vertical blanking operation is being made. The count output NV of the vertical counter 8 also represents the number of the horizontal scanning line which is currently scanned by an electron beam of the display unit 4. In this embodiment, the number of the horizontal scanning lines is set to "192", so that during a vertical non-display period the pulse signal VP is counted 64 times.

The image data processing circuit 9 is connected to the CPU 2 via an interface circuit 12 and is also connected to the VRAM 5. The image data processing circuit 9 writes data, fed from the CPU 2, into the respective table areas of the VRAM 5. After the completion of the writing of the data, the image data processing circuit 9 reads the data relating to a still image from the still pattern table area 5a, still pattern control table area 5b and still pattern color table area 5c of the VRAM 5 in response to a display command supplied from the CPU 2. The image data processing circuit 9 then determines the display position and color of each display element in accordance with the read data and sequentially outputs color codes, each composed of four bits, to a color palette circuit 13 from its output terminal TG in synchronism with the scanning position of the screen indicated by the outputs NH and NV of the horizontal and vertical counters 7 and 8. The image data processing circuit 9 also produces a horizontal and vertical synchronization signals necessary for the scanning of the screen and other necessary timing signals based on the outputs NH and NV of the horizontal and vertical counters 7 and 8, and combines the horizontal and vertical synchronization signals to form a synchronization signal SYNC which is supplied to the CRT display unit 4.

Along with the above-described display operation for the still image, the image data processing circuit 9 calculates data necessary for the display of animation images in accordance with the data contained in the animation pattern table area 5d and animation pattern control table area 5e. Then the image data processing circuit 9 reads necessary data from the VRAM 5 based on the calculated data and supplied the read data to an animation image processing circuit 15.

Figure 6:
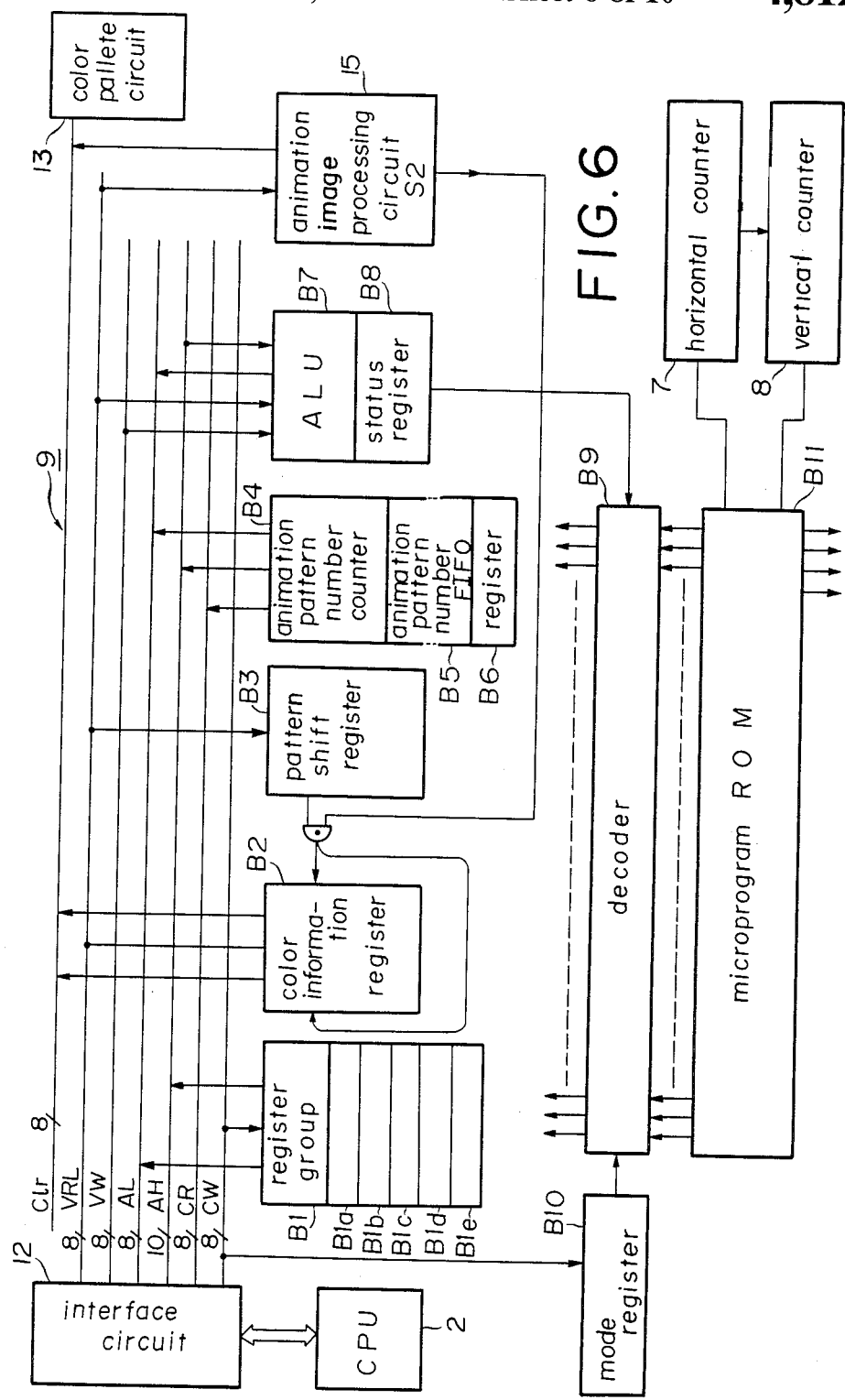
FIG. 6 is a block diagram of an image data processing circuit 9 of the VDP 1 shown in FIG. 2.

FIG. 6 shows a block diagram of the image data processing circuit 9 of the VDP 1. A bus CW (8 bits) is used for writing data fed from a CPU 2, and a bus CR (8 bits) is used for loading data into the CPU 2. A bus AH (10 bits) and a bus AL (8 bits) forms an address bus for designating addresses of the VRAM 5, the bus AH being the upper 10 bits of the address bus and the bus AL being the lower 8 bits thereof. A bus VW is used for writing data into the VRAM 5, and a bus VRL is used for reading data from the VRAM 5. A bus Clr is used for transferring color codes and is connected to the color palette circuit 13.

A register group B1 comprises registers B1a to B1e for storing data representative of the start addresses of the tables in VRAM5, still pattern control table area 5b, still pattern color table area 5c, still pattern table area 5a, animation pattern control table 5e and animation pattern table 5d, respectively. Data representative of other addresses of these tables replace the respective start address data under the control of the CPU 2 via the bus CW. A color information register B2 stores two kinds of still pattern color codes read from the still pattern color table area 5c, and selectively outputs one of these color codes onto the color bus Clr in accordance with the state ("1" or "0") of an output signal of a pattern shift register B3. The pattern shift register B3 converts parallel data, which is representative of the dot pattern of a row of display elements of a still pattern read from the VRAM 5 via the bus VRL, to serial data and feeds it to the color information register B2 to determine the color code to be outputted to the color palette circuit 13.

An animation pattern number counter B4 is a 7-bit counter which stores data representative of the number k (animation pattern number) of each animation pattern control table Ck and data representative of that address (1st byte in this embodiment) of the table Ck (FIG. 5-(b)) in which the Y coordinate is stored. In this case, the upper 5 bits of the counter B4 represent the animation pattern number while the lower 2 bits designate respectively the Y coordinate, the X coordinate, the pattern name and the color information by the states "00", "01", "10" and "11". When the animation pattern table 5e is searched to determine the animation patterns to be displayed on the next horizontal scanning line, the animation pattern number k is sequentially incremented in the animation pattern number counter B4. At this time, the lower 2 bits are always "0" state and designate only the Y coordinates stored in the animation pattern table 5e. This search checks the Y coordinate of each animation pattern control table Ck during the display period and compares it with the count output NV of the vertical counter 8. When the animation pattern to be displayed is found, the contents of the animation pattern number counter B4 is loaded into an animation pattern number first-in first-out memory (FIFO) B5. In this case, the animation pattern numbers k (0 to 31) are stored from the smallest one, and when the animation pattern number FIFO B5 stores up to 8 animation pattern numbers, it will refuse a further loading of the animation pattern number thereinto. Thus, during the horizontal display period, after up to 8 data points representative of animation pattern numbers of the animation pattern images to be displayed on the next horizontal scanning line are stored in the FIFO B5, these are sequentially read therefrom during the horizontal non-display period and used as address data for reading from the animation pattern control table Ck the data representative of the Y and X coordinates, names, CC and IC bits and color codes of the animation patterns to be displayed. Then, the data read from each animation pattern control table Ck are fed via the bus VRL to the animation image processing circuit 15 and are loaded thereinto. The detected ninth animation pattern number which is not loaded into the animation pattern number FIFO B5 is loaded into a register B6.

ALU (arithmetic and logic unit) B7 compares the count output NV of the vertical counter 8 with each Y coordinate, and effects address calculation of the animation pattern, and the results of these calculations are fed to a decoder B9 via a status register B8. In accordance with an output of a mode register B10, the decoder B9 decodes instructions fed from a microprogram ROM B11 and effects a sequential control of the data to be fed to the buses. The horizontal and vertical counters 7 and 8 are connected to the microprogram ROM B11 to address it to read the instructions therefrom.

The animation image processing circuit 15 controls the display of animation patterns by detecting display timing of the animation patterns in accordance with the data supplied thereto and by outputting color codes of each animation pattern to the color palette circuit 13 at the detected timing. This animation image processing circuit 15 is also constructed so as to detect a collision of animation patterns displayed on the screen and to output a collision detection signal S1 of "1" to the image data processing circuit 9 when a collision is detected. The animation image processing circuit 15 outputs a still image display signal S2 to the image data processing circuit 9 when it is detected that there is no animation pattern to be displayed. The image data processing circuit 9 is designed so as to output color codes for a still image only when the still image display signal S2 is supplied thereto, so that in the case where still and animation patterns overlap on the screen the animation pattern is preferentially displayed.

The color palette circuit 13 converts each of the color codes (four bits), supplied from the image data processing circuit 9, into red color data RD, green color data GD and blue color data BD each composed of three bits and supplies these color data RD, GD and BD to a digital-to-analog converter (DAC) 14 (FIG. 2). This DAC 14 converts the color data RD, GD and BD into analog color signals R, G and B, respectively, and feeds them to the CRT display unit 4 to thereby display the corresponding display element on the screen in the selected color. FIG. 7 shows the relationship of the color codes, color data GD, RD and BD, and the colors of display elements.

Figure 8:
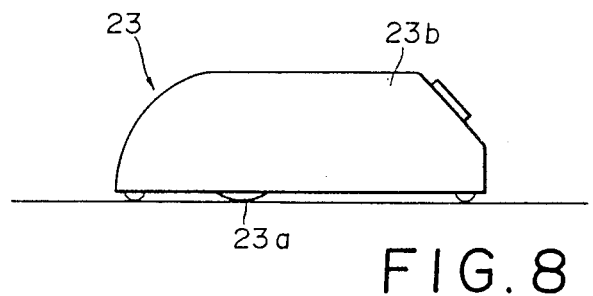
FIG. 8 is a side elevational view of a mouse 23 of the system of FIG. 2.
Figure 9:
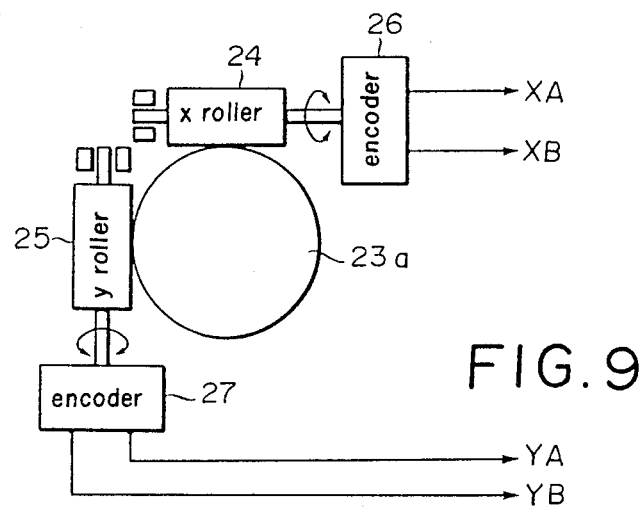
FIG. 9 is a schematic illustration of the internal construction of the mouse 23.
Figure 10:
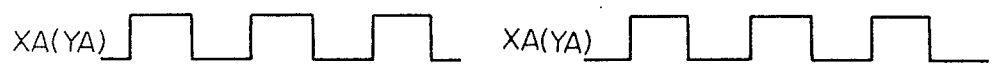
FIG. 10 is a time chart of the pulse signals XA (YA) and XB (YB) outputted from the mouse 23 when the mouse 23 is moved in a forward direction.
Figure 11:
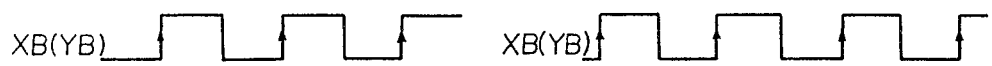
FIG. 11 is a time chart of the pulse signals XA (YA) and XB (YB) outputted from the mouse 23 when the mouse 23 is moved in a reverse direction.

A light pen driver 20 (FIG. 2) supplies a drive signal to a light pen 21 connected thereto, and outputs a light detection signal LP to the image data processing circuit 9 when a light is detected by the light pen 21. An input control device 23 for inputting X-Y coordinates of a display point on the screen is also shown, generally called a mouse. As shown in FIG. 8, the mouse 23 is provided with a metal ball 23a at the bottom of its body 23b. When the mouse 23 is moved on a surface such as the top surface of a desk, the ball 23a rolls so that X and Y components of the rolling movement of the ball 23a, i.e. the movement of the mouse 23 on the surface, are detected by the associated x and y rollers 24 and 25 (FIG. 9), respectively. The X and Y components of the movement of the mouse 23 thus detected by the rollers 24 and 25 are then converted into electric pulse signals XA, XB and YA, YB by X and Y encoders 26 and 27, respectively. The pulse signals XA and XB (YA and YB) vary as shown in FIG. 10 when the roller 24 (25) rotates in the forward direction, while the pulse signals XA and XB (YA and YB) vary as shown in FIG. 11 when the rollers 24 (25) rotates in the reverse direction.

Figure 12:
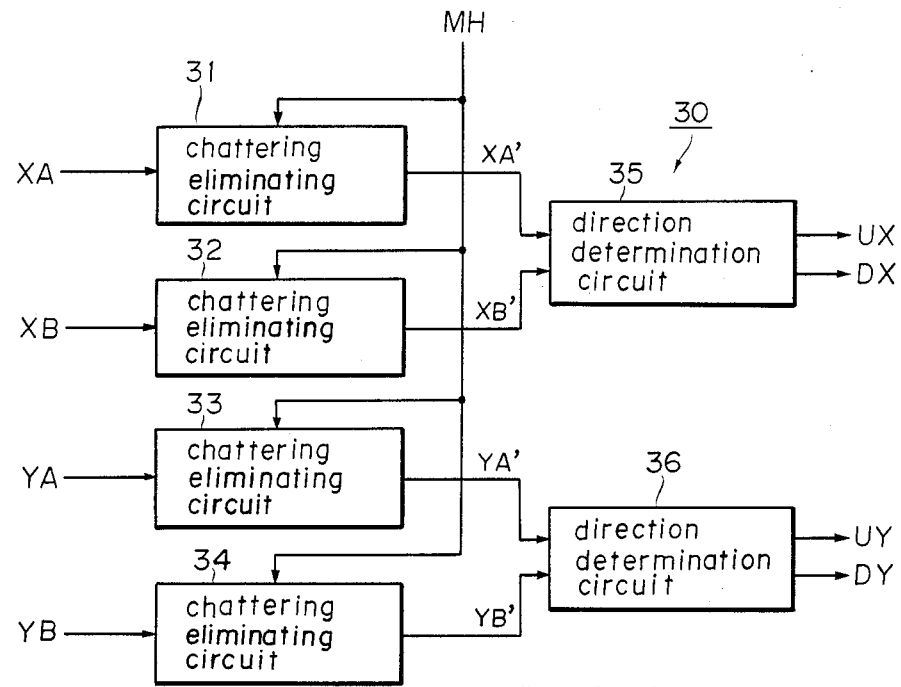
FIG. 12 is a block diagram of a mouse interface 30 of the VDP 1 shown in FIG. 2.

Referring again to FIG. 2, a mouse interface 30 produces an up-pulse signal UX and a down-pulse signal DX, which are signals representative of the movement of the mouse 23 in the X direction, in accordance with the pulse signals XA and XB, and also produces an up-pulse signal UY and a down-pulse signal DY, which are signals representative of the movement of the mouse 23 in the Y direction, in accordance with the pulse signals YA and YB. The mouse interface 30 comprises, as shown in FIG. 12, chattering eliminating circuits 31 to 34 for eliminating chattering from the pulse signals XA, XB, YA and YB, respectively. The chattering eliminating circuit 31 comprises a sampling circuit (not shown) for sampling its input pulse signal XA by a pulse signal MH supplied from the image data processing circuit 9, and a flip-flop (not shown) which is set when three successive ones of the sampled signals are "1" and is reset when three successive ones of the sampled signals are "0", the output signal XA' of the flip-flop, which is "1" when the flip-flop is set, being outputted from this chattering eliminating circuit 31. The chattering eliminating circuits 32 to 34 are of the same construction as that of the above-described chattering eliminating circuit 31. The pulse signal MH is outputted from the image data processing circuit 9 in the middle of each time period between two adjacent horizontal synchronization signals which are also produced by the image data processing circuit 9, and therefore the period of the pulse signal MH is quite smaller than those of the pulse signals XA, XB, YA and YB. With this arrangement, the pulse signals XA', XB', YA' and YB' outputted from the chattering eliminating circuits 31 to 34 do not include the chattering of the signals XA, XB, YA and YB, but the waveforms thereof are substantially the same as those of the signals XA, XB, YA and YB. The pulse signals XA' and XB' are supplied to a direction determination circuit 35, while the pules signals YA' and YB40 are supplied to another direction determination circuit 36. The direction determination circuit 35 examines a signal level of the pulse signal XA' at every leading edge of the pulse signal XB', and outputs the up-count pulse UX if the signal level of the pulse signal XA' is "1", which corresponds to the relation shown in FIG. 10. On the other hand, the direction determination circuit 35 outputs the down-pulse DX if the signal level of the pulse signal XA' is "0" at the leading edge of the pulse signal XB', which corresponds to the relation shown in FIG. 11. The direction determination circuit 36 has the same construction as that of the above-described direction determination circuit 35. Thus, the numbers of the pulse signals UX and DX outputted from the direction determination circuit 35 represent the amount of movement of the mouse 23 in the +X direction and that in the −X direction, respectively. Similarly, the numbers of the pulse signals UY and DY represent the amount of movement of the mouse 23 in the +Y direction and that in the 31 Y direction, respectively.

Figure 13:
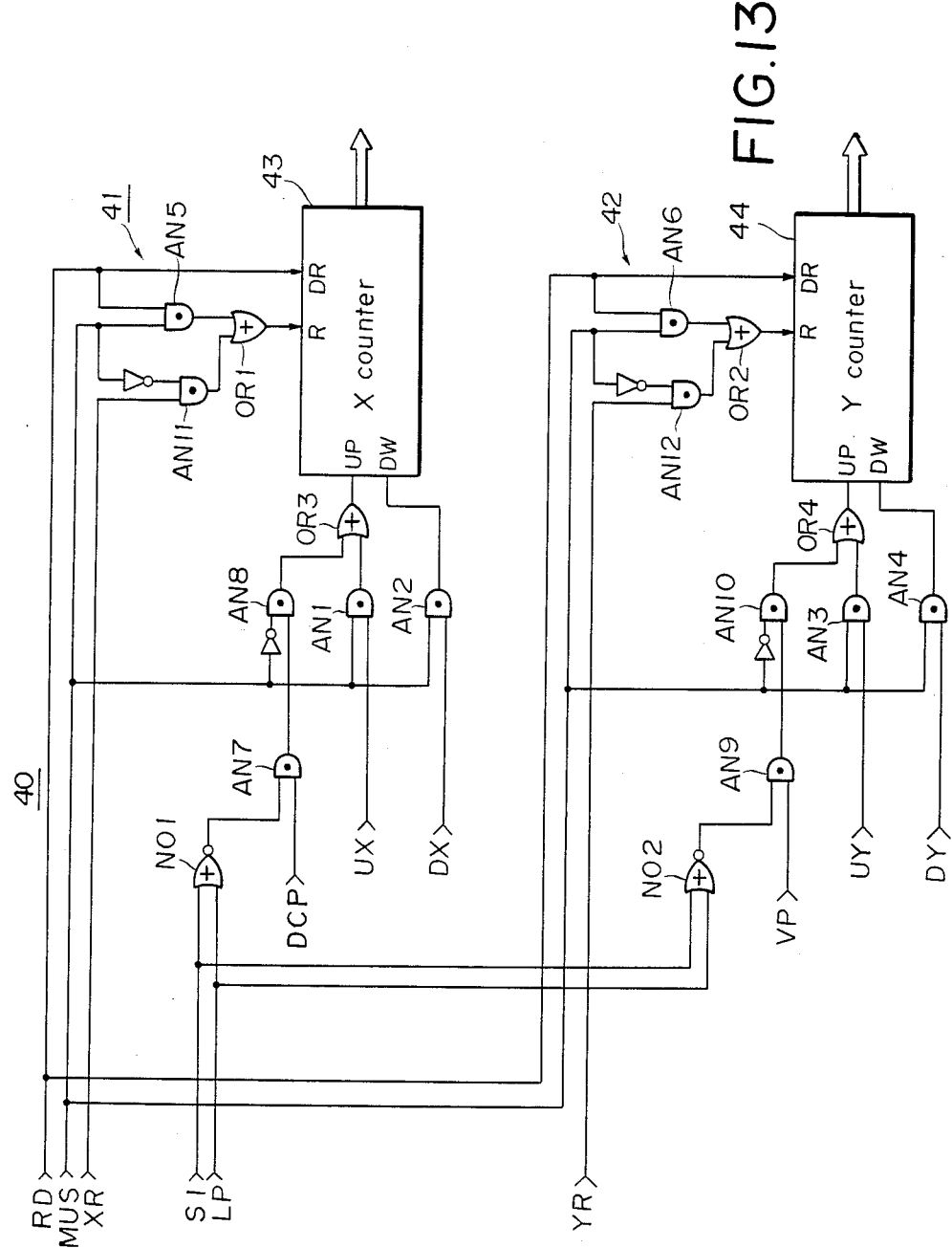
FIG. 13 is a circuit diagram of a counter circuit 40 of the VDP 1 shown in FIG. 2.

The pulse signals UX, DX, UY and DY are supplied to an XY counter circuit 40 shown in FIG. 2. This XY counter circuit 40 is comprised of an X count control section 41 and a Y count control section 42 of the same construction, as shown in FIG. 13, and is supplied with various control signals from the image data processing circuit 9.

As shown in FIG. 2, the image data processing circuit 9 further comprises a register 50 whose contents can be changed by the CPU 2. One of the bits of the register 50 is used for outputting a signal MUS to the XY counter circuit 40. The signal MUS is rendered "1" to select the mouse 23 (mouse mode) and is rendered "0" in other cases. When the signal MUS is rendered "1", AND gates AN1 to AN4 shown in the detailed depiction of counter 40 in FIG. 13 are enabled to conduct. As a result, the pulse signals UX and DX are supplied respectively to an up-count input terminal UP and a down-count input terminal DW of an X counter 43, while the pulse signals UY and DY are supplied respectively to an up-count input terminal UP and a down-count input terminal DW of a Y counter 44. And therefore, the contents of the X counter 43 and Y counter 44 represent the amount of movement of the mouse 23 in the X direction and that in the Y direction, respectively. The CPU 2 reads the contents of the X counter 43 and Y counter 44 by outputting a read signal RD through the image data processing circuit 9 to this XY counter circuit 40. In response to the signal RD, the XY counter 40 outputs the contents of the X counter 43 and Y counter 44 to the image data processing circuit 9 whereupon the CPU 2 reads the contents from the image data processing circuit 9. In this case, the signal RD is supplied to a reset terminal R of the X counter 43 through an AND gate AN5 and an OR gate OR1 and is also supplied to a reset terminal R of the Y counter 44 through an AND gate AN6 and an OR gate OR2, since the AND gates AN5 and AN6 are enabled to open by the signal MUS. Thus, in the case where the signal MUS is in a "1" state, the X and Y counters 43 and 44 are reset each time their contents are read by the CPU 2. When the signal MUS is "0", the reset operation of the X and Y counters 43 and 44 is not effected.

The XY counter circuit 40 is also supplied, through the image data processing circuit 9, with the collision detection signal S1, which is outputted from the animation image processing circuit 15, and the light detection signal LP outputted from the light pen driver 20. When all of the signals S1, LP and MUS are "b 0", the dot clock pulse DCP is supplied through AND gates AN7 and AN8 and an OR gate OR3 to the up-count input terminal UP of the X counter 43. Also, the pulse signal VP, which is outputted correspondingly to each horizontal scanning line, is supplied through AND gates AN9 and AN10 and an OR gate OR4 to the up-count input terminal UP of the Y counter 44.

The image data processing circuit 9 also comprises, as shown in FIG. 2, a reset control circuit 60 which generates reset signals XR and YR for resetting the X counter 43 and Y counter 44, respectively, in accordance with the contents of the horizontal and vertical counters 7 and 8 and in accordance with a signal L/C outputted from another bit position of the register 50. These reset signals XR and YR are effective only when the AND gates AN11 and AN12 are enabled to open by the signal MUS of "0" state.

Figure 14:
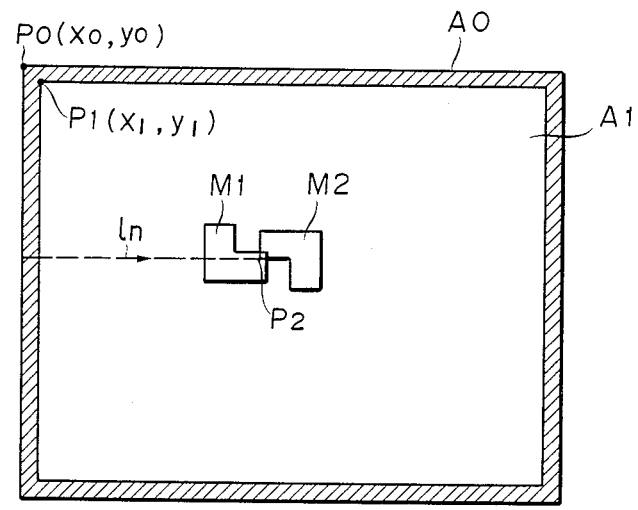
FIG. 14 is an illustration showing an image displayed on a screen of a CRT display unit 4 of the system of FIG. 2.
Figure 1:
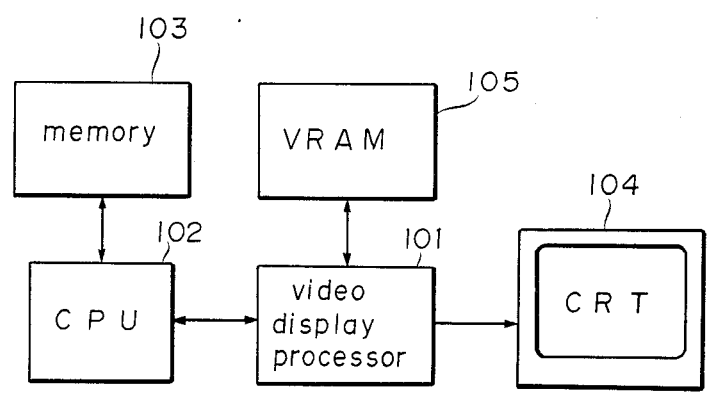
FIG. 1 is a block diagram of a video display control system comprising a conventional video display processor.

The generation of the reset signals XR and YR by the reset control circuit 60 will now be described. FIG. 14 illustrates one example of video images displayed on the screen of the CRT display unit 4. As shown in FIG. 14, a backdrop image is displayed in a hatched area A0 of the screen, while still and animation images are displayed in an area A1 of the screen. It is assumed that X-Y coordinates (x0, y0) of the display point P0 disposed in the upper left corner of the display area A0 is the origin (0, 0) of the x-y coordinates in this display area A0 and that X-Y coordinates (x1, y1) of the display point P1 disposed in the upper left corner of the display area A1 is the origin (0, 0) of the x-y coordinates in the display area A1. In this case, x-y coordinate of a display point P2 at which a collision of an animation image M1 with another animation image M2 has occurred must be detected relative to the origin (0, 0) of X-Y coordinates of the display area A1. On the other hand, when the light pen 21 is used to input X-Y coordinates of a selected display point on the screen, the X-Y coordinates must be detected relative to the origin (0, 0) of the x-y coordinates of the display area A0. And therefore, in the case where the light pen 21 is used (light pen mode), the reset control circuit 60 outputs, in accordance with the count outputs of the horizontal and vertical counters 7 and 8, the reset signal XR each time X coordinate of the scanning position coincides with "x0", and also outputs the reset signal YR each time Y coordinate of the scanning position coincides with "y0". On the other hand, in the case of the collision detection (collision detection mode), the reset control circuit 60 outputs the reset signal XR each time x coordinate of the scanning position coincides with "x1", and outputs the reset signal YR each time Y coordinate of the scanning position coincides with "y1". Thus, the reset control circuit 60 operates in the light pen mode when the signal L/C supplied from the register 50 is in a "1" state, and operates in the collision detection mode when the signal L/C is in a "0" state.

The operation of this video display control system will now be more fully described.

(1) Light pen mode

To enter into this mode, the CPU 2 writes data into the register 50 so that the signal MUS is rendered "0" and that the signal L/C is rendered "1". As a result, the X counter 43 begins to up-count the dot clock pulse DCP, and the y counter 44 begins to up-count the pulse signal VP. Also, the reset control circuit 60 outputs the reset signal XR each time the x coordinate of the scanning position coincides with "x0" shown in FIG. 14, and outputs the reset signal YR each time the y coordinate of the scanning position coincides with "y0". Consequently, the contents of the X and Y counters 43 and 44 represent the X-Y coordinates of the current scanning position which vary relatively to the X-Y coordinates of the display position P0, i.e., the origin (0, 0) of the X-Y coordinates of the display area A0.

When the distal end of the light pen 21 is brought into contact with a selected display point in an image on the screen by the operator, the light pen driver 20 outputs the light detection signal LP at the instant that the scanning position coincides with the selected display point during the first display period of a frame or a field of the image after the contact of the light pen. The light detection signal LP is supplied via the image data processing circuit 9 to NOR gates N01 and N02 shown in FIG. 13. As a result, the AND gates AN7 and AN9 are closed so that the X and Y counters 43 and 44 are prevented from being supplied with the dot clock pulse DCP and the pulse signal VP. In other words, the count operation of the X and Y counters 43 and 44 is stopped when the light detection signal LP is outputted, i.e., when the contents of the X and Y counter 43 and 44 coincide with the xY coordinates of the display point selected through the light pen. Then, the CPU 2 reads in response to the light detection signal LP the contents of the X and Y counters 43 and 44 via image data processing circuit 9 thereby to load the X-Y coordinates of the selected display point thereinto. After the completion of the above read operation by the CPU 2, another read operation of the next display point selected by the light pen can be performed in the similar manner.

(2) Collision detection mode

To enter into this mode, the CPU writes data into the register 50 so that the signal MUS is rendered "0" and that the signal L/C is also rendered "0". As a result, the X counter 43 begins to up-count the dot clock pulse DCP, and the Y counter 44 begins to up-count the pulse signal VP, as in the aforesaid light pen mode. On the other hand, the reset control circuit 60 outputs the reset signal XR each time the x coordinate of the scanning position coincides with "x1" shown in FIG. 14, and outputs the reset signal YR each time the y coordinate of the scanning position coincides with "y1". Consequently, the contents of the X and Y counters 43 and 44 represent the X-Y coordinates of the current scanning position which vary relatively to the X-Y coordinates of the display point P1, i.e., the origin (0, 0) of the X-Y coordinates of the display area A1. Assuming that animation images M1 and M2 are to be displayed on the screen as shown in FIG. 14, the animation image processing circuit 15 detects a collision of the animation images M1 and M2 when the scanning position reaches a display point P2 where the two animation images M1 and M2 overlap, and outputs the collision detection signal S1. This collision signal S1 is supplied through the image data processing circuit 9 to the NOR gates N01 and N02 (FIG. 13). As a result, the NOR gates N01 and N02 are closed so that the dot clock pulse DCP and the pulse signal VP are prevented from being supplied to the X and Y counters 43 and 44. In other words, the count operation of the X and Y counters 43 and 44 is stopped when the collision detection signal S1 is outputted, i.e., when the contents of the X and Y counter 43 and 44 coincide with the X-Y coordinates of the display point P2 where the collision has occurred. Then, the CPU 2 reads in response to the collision detection signal S1 the contents of the X and Y counters 43 and 44 via image data processing circuit 9 thereby to load the X-Y coordinates of the display point P2 thereinto. After the completion of the above read operation by the CPU 2, another read operation of the next collision position can be performed in the similar manner.

(3) Mouse mode

To enter into this mode, the CPU 2 writes data into the register 50 so that the signal MUS is rendered "1". In this case, the signal L/C may be set to any state. The reason for this is that the reset signals XR and YR outputted from the reset control circuit 60 are ignored by the XY counter circuit 40 when the signal MUS is in a "1" state. Thus in this mouse mode, the contents of the X and Y counters 43 and 44 vary irrespective of the X-Y coordinates of the scanning position on the screen.

When the mouse 21 is moved by the operator with the signal MUS being "1", the pulse signals UX and DX, which are outputted correspondingly to the movement of the mouse 21 in the X direction, are counted by the X counter 43. Also, the pulse signals UY and DY, which are outputted correspondingly to the movement of the mouse 21 in the Y direction, are counted by the Y counter 44. When the CPU 2 reads the contents of the X and Y counters 43 and 44 via image data processing circuit 9, the X and Y counters 43 and 44 are reset by the read signal RD outputted from the CPU 2. Thus, the contents of the X and Y counters 43 and 44 represent the amount of movement of the mouse 23 accumulated from the time when the CPU 2 has previously read the contents of the X and Y counters 43 and 44.

The XY counter circuit 40 can thus generate a desired data in any of the light pen mode, the collision detection mode and the mouse mode with a minimum circuitry.

What is claimed is:

1. A video display processor adapted to be connected to a central processing unit and a video image display unit for displaying a video image composed of a plurality of display elements, each said element adapted to be displayed at a display pixel on a screen of the video image display unit under control of the central processing unit, said video display processor comprising:

(a) clock signal generating means for generating a dot clock signal defining positions on said screen;

(b) image data means for outputting a plurality of image data points, each representative of a respective area of said plurality of display elements of the video image, to the video image display unit in accordance with said dot clock signal;

(c) mode selection means for selecting one of first and second modes, said mode selection means outputting a first mode signal when said first mode is selected, and outputting a second mode signal when said second mode is selected; and (d) X-Y counter means for accumulating count data, (1) in response to said first mode signal, by counting a pulse signal from a device which is movable relative to a surface and outputs a pulse signal in accordance with the movement thereof to output movement amount data representative of an amount of said movement of said device to be used to determine an amount of movement from a reference position, said X-Y counter means including means for resetting, in said first mode, when said central processing unit reads said movement data output from said X-Y counter means, and (2) in response to said second mode signal, counting said clock dot signal to accumulate a tally of count data representative of horizontal and vertical coordinates of a display position of said display element whose image data is being outputted from said image data output means and including means for receiving a signal from a dot position detection device in said second mode, the central processing unit reading said count data from said counter means responsive thereto.

2. A video display processor according to claim 1, wherein said detection signal generating means comprises light pen interfacing means connectable to a light pen, said light pen interfacing means generating said detection signal when said light pen outputs a light detection signal.

3. A video display processor according to claim 1, wherein the video image displayed on the screen includes at least two animation patterns, said detection signal generating means comprising collision detection means for generating a collision detection signal when said image data output means outputs said plurality of image data in such a manner that said at least two animation patterns overlap on said screen, said central processing unit reading said count data from said X-Y counter means in response to said collision detection signal when said second mode is selected.

4. A video display processor, comprising:

controlling means for outputting a plurality of image data points, each said image data point representative of a respective one of a plurality of pixels on a video image screen;

means for outputting a pulse signal for controlling the position of a currently output image data point;

first means for generating an image data point detection signal;

second means for generating a relative position change signal;

mode for controlling means, coupled to said first and second means, for controlling which of said first and second means will provide information, a first mode being an image data point detection signal accepting mode, and a second mode being a relative position change signal accepting mode;

counter means, responsive to said mode controlling means, for: (1) in said first mode, counting said pulse signal to accumulate an address of a position, and receiving said image data point detection signal to indicate a recognized position to send out said count at said recognized position and (2) in said second mode, receiving said relative position change signal and counting said information, including means for reading a count information from said counter means, said reading means resetting the values in said counter means when said mode controlling means is in said second mode.

5. An apparatus as in claim 4 wherein said controlling means is also for resetting a horizontal address value in said counter means at the end of a horizontal area, and for resetting a vertical address value in said counter means at the end of a vertical area, when said counter means is in said first mode 6. An apparatus as in claim 4 wherein said controlling means is also for resetting a horizontal address value in said counter means at the end of a horizontal area, and for resetting a vertical address value in said counter means at the end of a vertical area, when said counter means is in said first mode.

7. An apparatus as in claim 4 wherein said mode controlling means includes a plurality of and-gates and or-gates.

8. An apparatus as in claim 7 wherein said mode controlling means produces a signal which selectively enables different ones of said and-gates and said or-gates depending which of said first and second modes is enabled.

9. An apparatus as in claim 6 wherein said second means includes at least one of a mouse or a track ball device.

10. An apparatus as in claim 6 wherein said first means includes a light pen.

11. An apparatus as in claim 9 wherein said first means includes a light pen.

12. An apparatus as in claim 11 further comprising means for receiving light from said light pen as a synchronization to said counter means.

13. An apparatus as in claim 6 further comprising means for detecting a collision between different elements to be displayed on said video screen.

14. A device as in claim 13 wherein said collision detecting means has an output coupled to said reading means to cause an address to be read from said counter means.

15. A video display processor as in claim 1 wherein said clock signal generating means includes means for producing a first clock signal indicative of a change in horizontal position on said screen and a second clock signal indicative of a change in vertical position on said screen, said image data means outputting image data points in accordance with said first and second clock signals and said X-Y counter means counting said X and Y clock signals in said second mode.

* * * * *